Figure 1:
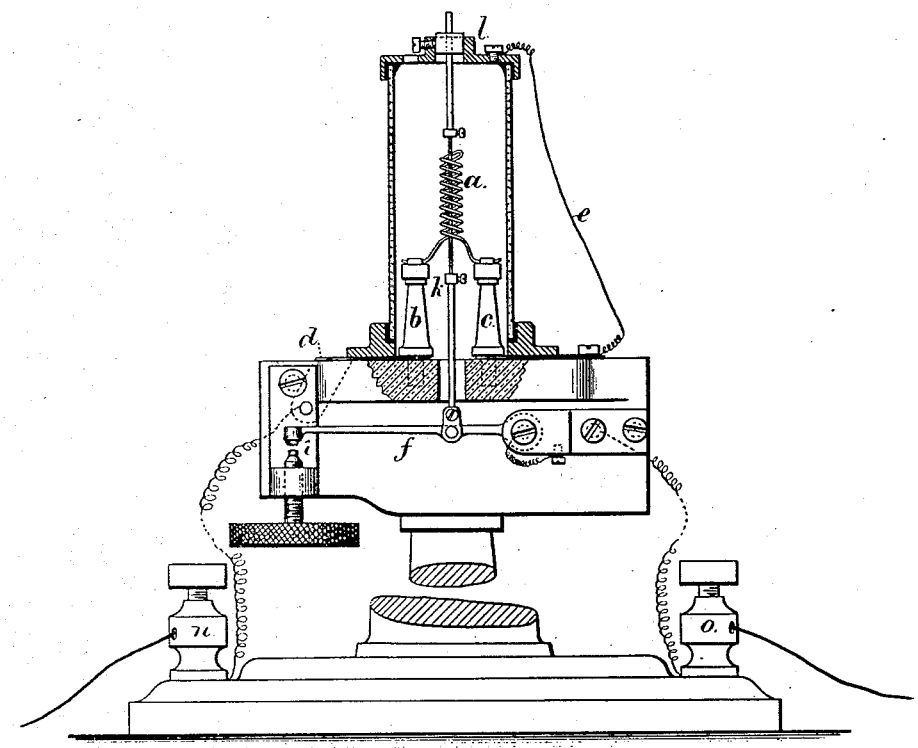

T. A. EDISON.
Electric-Lights.

No. 214,636.  Patented April 22, 1879.

Witnesses
Chas. H. Smith
Geo. T. Pinckney

Inventor
Thomas A. Edison
Lemuel W. Serrell
Atty

UNITED STATES PATENT OFFICE.

THOMAS A. EDISON, OF MENLO PARK, NEW JERSEY.

IMPROVEMENT IN ELECTRIC LIGHTS.

Specification forming part of Letters Patent No. 214,636, dated April 22, 1879; application filed October 14, 1878.

CASE 156.

*To all whom it may concern:*

Be it known that I, THOMAS A. EDISON, of Menlo Park, in the State of New Jersey, have invented an Improvement in Electric Lights, of which the following is a specification.

Electric lights have been produced by a coil or strip of platina or other metal that requires a high temperature to melt, the electric current rendering the same incandescent. In all such lights there is danger of the metal melting and destroying the apparatus, and breaking the continuity of the circuit.

My improvement is made for regulating the electric current passing through such incandescent conductor automatically, and preventing its temperature rising to the melting-point, thus producing a reliable electric light by rendering conducting substances incandescent by passing an electric current through them.

In my apparatus the heat evolved or developed is made to regulate the electric current, so that the heat cannot become too intense, because the current is lessened by the effect of the heat when certain temperatures are reached, thereby preventing injury to the incandescent substance, by keeping the heat at all times below the melting-point of the incandescent substance.

Various devices for carrying my improvement into practice may be employed, and I have tested a large number. I however have shown in the drawings my improvement in a convenient form, and contemplate obtaining separate patents hereafter for other and various details of construction, and I state my present invention to relate, broadly, to the combination, with an electric light produced by incandescence, of an automatic thermal regulator for the electric current.

Figure 2:
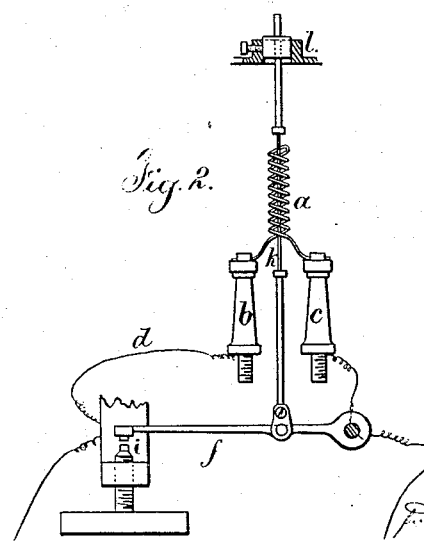

Figure 1 represents the electric-light apparatus in the form in which the thermal regulator acts by the heating effect of the current itself, and Fig. 2 illustrates the same invention when the radiated heat from the incandescent conductor operates the thermal regulator.

The incandescent metal is to be platinum, rhodium, iridium, titanium, or any other suitable conductor having a high fusing-point, and the same is used in the form of a wire or thin plate or leaf.

I have shown the platinum wire $a$ as a double spiral, the two ends terminating upon the posts $b\ c$, to which the conductors $d\ e$ are connected. The double spiral $a$ is free to expand or contract by the heat, as both ends are below the spiral.

A circuit-closing lever, $f$, is introduced in the electric circuit, the points of contact being at $i$, and there is a platinum or similar wire, $k$, connected from the lever $f$ to the head-piece or other support $l$.

The current from a magneto-electric machine, a battery, or any other source of electric energy, is connected to the binding-posts $n\ o$, and when contact at $i$ is broken the current passes from $o$ through lever $f$, wire $k$, support $l$, wire $e$, post $c$, platina coil $a$, post $b$, and wire $d$, or metallic connection, to binding-screw $n$. In this instance the wire $k$, being small, is acted upon by the electric current and heated, and by its expansion the lever $f$ is allowed to close upon $i$ and short-circuit the current.

The contact-point $i$ is movable, and it is adjusted so that the shunt will not be closed until the temperature of the apparatus arrives at the desired height, and, by diverting a portion or the whole of the current, the temperature of the incandescent conductor is maintained in such a manner that there will be no risk of the apparatus being injured by excessive heat or the conductor fused.

If the wire $k$ is small, so as to be heated by the electricity itself, it may be placed in any convenient position relatively to the light; but if such wire is heated by radiation from the electric light, then it should be adjacent to the incandescent material.

In all instances, the expansion or contraction of a suitable material under changes of temperature forms a thermostatic current-regulator that operates automatically, to prevent injury to the apparatus and to the body heated by the current.

In Fig. 2 the current does not pass through the wire $k$, and the short-circuiting lever is operated by the radiated heat expanding the wire $k$. This in practice does not operate as rapidly as the device shown in Fig. 1.

The electric light may be surrounded by a glass tube or any other suitable device, such as two concentric glass tubes with the intervening space filled with alum-water or other bad conductor of heat, the object being to retain the heat of the incandescent metal and prevent loss by radiation, thus requiring less current to supply the loss by radiation.

I am aware that the electric current has been used to produce heat, and that such heat has been employed to vary the relative position of the light-giving electrodes and the length of the intervening arc. In my light there is no electric arc.

I claim as my invention—

1. In combination with an electric light having a continuous incandescent conductor, a thermostatic circuit-regulator, substantially as set forth.

2. In combination with an electric light, a thermostatically-operated shunt, substantially as set forth.

Signed by me this 5th day of October, A. D. 1878.

THOMAS A. EDISON.

Witnesses:
ALFRID SWANSON,
STOCKTON L. GRIFFIN.